US008432887B1

(12) United States Patent
Ding

(10) Patent No.: US 8,432,887 B1
(45) Date of Patent: Apr. 30, 2013

(54) MEDIUM ACCESS CONTROL FOR TREE-TOPOLOGY NETWORKS

(75) Inventor: Gang Ding, San Diego, CA (US)

(73) Assignee: Olympus Corporation, Tokyo (JP)

( * ) Notice: Subject to any disclaimer, the term of this patent is extended or adjusted under 35 U.S.C. 154(b) by 489 days.

(21) Appl. No.: 12/729,073

(22) Filed: Mar. 22, 2010

Related U.S. Application Data

(60) Provisional application No. 61/176,830, filed on May 8, 2009.

(51) Int. Cl.
*H04B 7/212* (2006.01)
(52) U.S. Cl.
USPC ............ 370/348; 370/444; 370/462; 370/498
(58) Field of Classification Search ........................ None
See application file for complete search history.

(56) References Cited

U.S. PATENT DOCUMENTS 7,826,475 B2 * 11/2010 Lee et al. ...................... 370/445
2007/0081490 A1 * 4/2007 Kim et al. ..................... 370/329

OTHER PUBLICATIONS

IEEE 802.15.6 Technical Requirements, 15-08-0644-09-0006, 2008.
NICT MAC preliminary proposal , Part I and II, 15-09-0162-00-0006, Mar. 2009.
Network Merging, 15-09-0133-00-0006, Mar. 2009.
IEEE Std 802.15.4—2006.
Enhancements to IEEE 802.15.4, 15-04-0313-01-004b, 2004.
Beacon Collision Avoidance Mechanism for IEEE 802.15.4e MAC,15-08-0618-01-004e, 2008.
Collision-Free Beacon Scheduling Mechanisms for IEEE 802. 15.4/Zigbee Cluster-Tree Wireless Sensor Networks, in 7th International Workshop on Applications and Services in Wireless Networks, 2007.
Distributed MAC for Wireless Networks, WiMedia MAC specification, 2008.
IEEE 802.15-01/508rl Project: IEEE P802.15 Working Group for Wireless Personal Area Networks (WPANs) Nov. 14, 2001.
IEEE 802.15-03/036r0 Project: IEEE P802.15 Working Group for Wireless Personal Area Networks (WPANs) Jan. 2003.
ECMA International , Standard ECMA 1st Edition/Dec. 2005 High Rate Ultra Wideband PHY and MAC Standard.
ECMA International , Standard ECMA 3rd Edition/Dec. 2008 High Rate Ultra Wideband PHY and MAC Standard.

* cited by examiner

*Primary Examiner* — Kwang B Yao
*Assistant Examiner* — Alex Skripnikov
(74) *Attorney, Agent, or Firm* — Sheppard Mullin Richter & Hampton LLP

(57) ABSTRACT

According to various embodiments of the invention, a MAC protocol is presented that provides for coordinated communication in a personal area network. Further embodiments of the invention provide methods for aligning communications among multiple networks to reduce interference between the networks. Still further embodiments provide methods for communication frame formatting that allow prioritized access between a network coordinator and an end device while allowing the remaining end devices to communicate with the coordinator. In particular embodiments, the MAC protocol may be implemented in a BAN or WPAN.

20 Claims, 14 Drawing Sheets

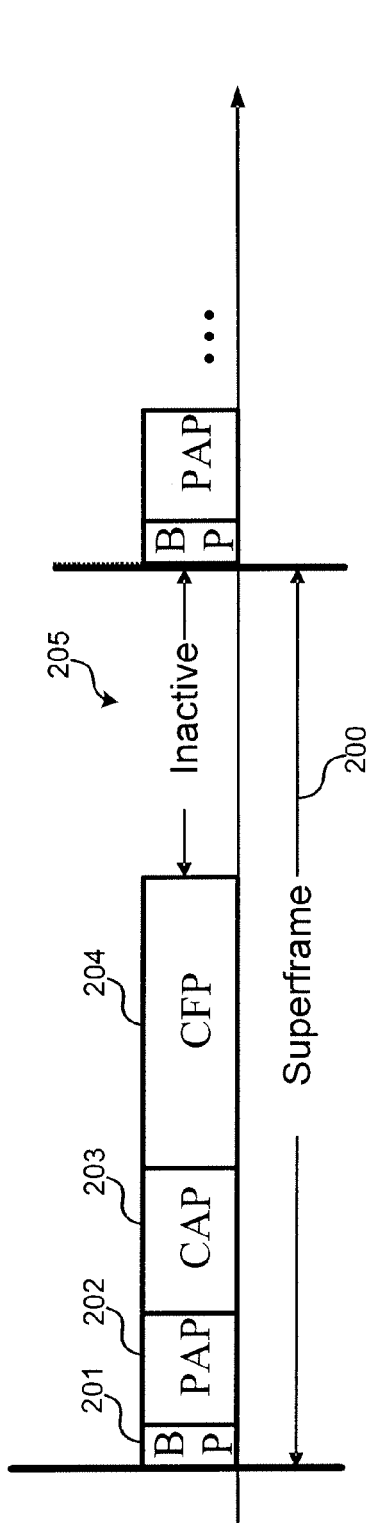
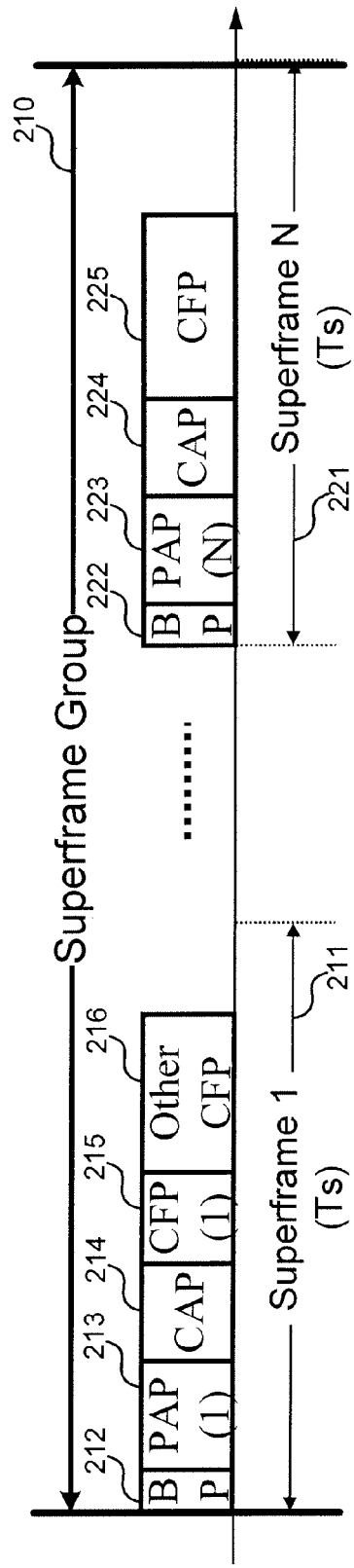

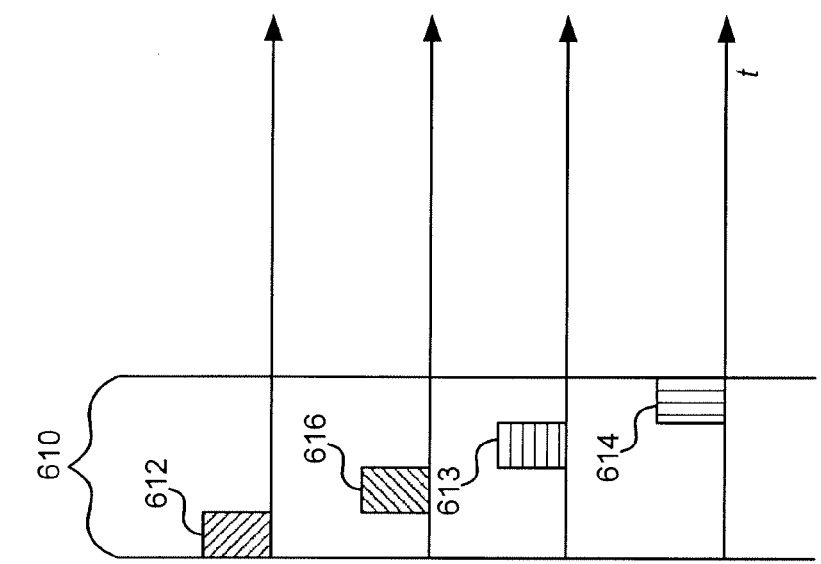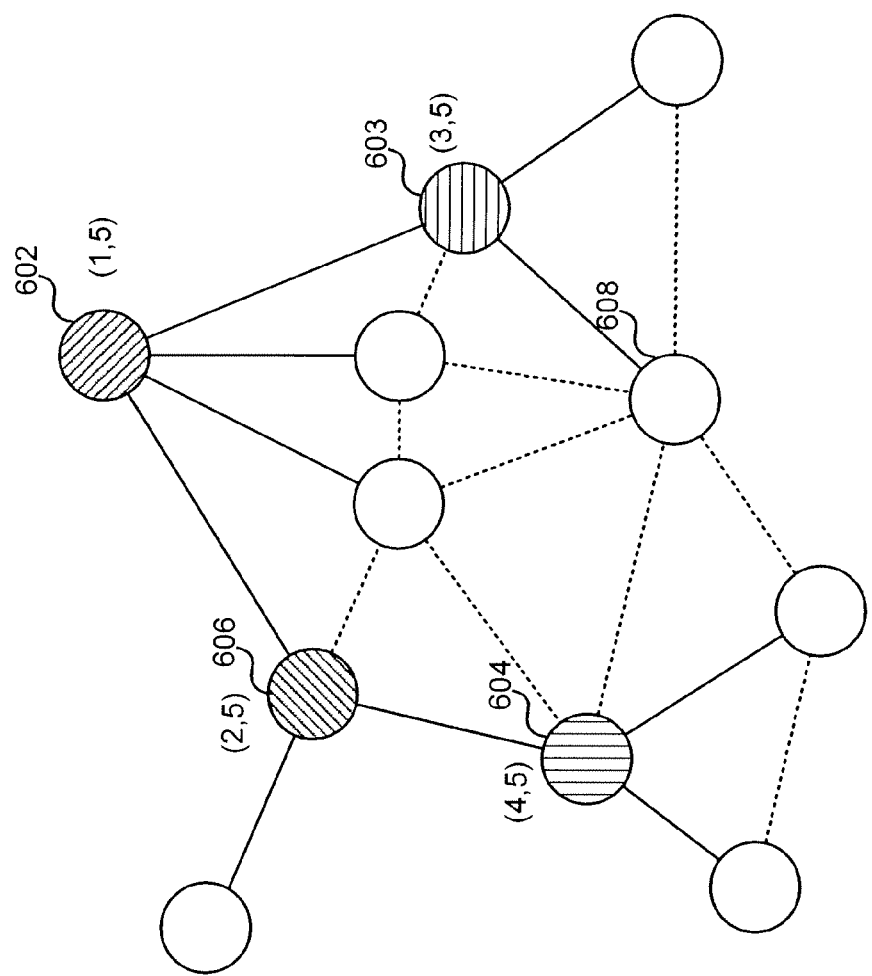
Fig. 6

MEDIUM ACCESS CONTROL FOR TREE-TOPOLOGY NETWORKS

CROSS-REFERENCE TO RELATED APPLICATIONS

This application claims priority from Provisional U.S. Application No. 61/176,830 filed May 8, 2009, which is hereby incorporated herein by reference in its entirety.

TECHNICAL FIELD

The present invention relates generally to communication networks, and more particularly, some embodiments relate to medium access control (MAC) protocols for tree-topology body area networks (BANs).

DESCRIPTION OF THE RELATED ART

A body area network (BAN) is intended for short range wireless communication in close proximity to, or inside, a body. It aims to support a low complexity, low cost, ultra-low power and highly reliable wireless communication to satisfy an evolutionary set of entertainment and healthcare products and services. Dependent on the application, the BAN devices may require a network of anywhere from a few up to 256 sensor or actuator devices communicating to one or more coordinators. The end devices are usually highly constrained in terms of resource such as CPU processing power, battery capacity and memory size, and may operate in unstable environments. At the same time, many end devices have to be physically small to be wearable or implantable. The coordinators may also have some form of resource constraints. However, they are typically less constrained than the end devices.

A BAN may involve multiple coordinators that are connected in a tree topology network, where the end devices are leaves in the tree. A BAN may also have multiple trees. A BAN may operate indoor, outdoor in home, hospital, small clinic, fitness center etc., where there are other BANs come and go. So there may be interference from and to surrounding BANs.

Different BANs can have very different quality of service (Qos) requirements depending on their application. Most biomedical and vital signals tend to be periodic and of low frequency. Other applications, such as motion detection and fall detection for the elderly or disabled people, can be event-based and therefore the data traffic is bursty. Some applications may involve transmitting a large log file once a day. Some medical sensors may detect alarm conditions and require reliable and quick communication with the coordinator (e.g., <1 sec.). Non-medical applications, such as interactive games, sports/fitness, and real-time multimedia, include real time video and audio traffic that requires guaranteed high data throughput and is particularly sensitive to the end-to-end latency and latency variance.

Current Media Access Control (MAC) protocols for Wireless Personal Area Networks (WPANs) are mainly designed for a star-topology where there is only one coordinator that communicates with its end devices. This raises scalability issues when the number of end devices grows beyond a coordinator's capabilities (for example, power and complexity considerations may prevent more than about 10 end devices from linking with a given coordinator). MAC protocols for star-topology networks are typically not suitable for meeting the needs of tree-topology BANs that involve multiple coordinators. For example, the interference from coordinators and end devices in the same or different tree or BAN is not taken into consideration.

BRIEF SUMMARY OF EMBODIMENTS OF THE INVENTION

According to various embodiments of the invention, a MAC protocol is presented that provides for coordinated communication in a personal area network. Further embodiments of the invention provide methods for aligning communications among multiple networks to reduce interference between the networks. Still further embodiments provide methods for communication frame formatting that allow prioritized access between a network coordinator and an end device while allowing the remaining end devices to communicate with the coordinator. In particular embodiments, the MAC protocol may be implemented in a BAN or WPAN.

According to an embodiment of the invention, a method for a network coordinator to communicate on a network, comprises associating with an end device; scheduling a priority access period for the end device during a communications window, wherein the priority access period is reserved for communications between the end device and the network coordinator; scheduling a contention access period for communications with the network coordinator during the communications window; and scheduling a contention free period for communications with the network coordinator during the communications window.

According to another embodiment of the invention, a method for a network coordinator to participate in beacon slot distribution in a network, wherein the network coordinator is one of a plurality of network coordinators in a tree topology, wherein network communications take place during superframes bounded by beacon periods, wherein a beacon period comprises a number of beacon slots, comprises the network coordinator transmitting a beacon during an assigned beacon slot of the beacon period, wherein the beacon comprises information about its assigned beacon slot, information about its perceived next available beacon slot, and information about the number of newly joined network coordinators in a sub-tree of the tree topology rooted at the network coordinator; the network coordinator receiving another network coordinator's beacon during the other network coordinator's beacon comprising information about the other network coordinator's assigned beacon slot, information about the other network coordinator's perceived next available beacon slot, and information about the number of newly joined network coordinators in a second sub-tree of the tree topology rooted at the other network coordinator; and implementing a beacon slot distribution protocol such that any newly joined network coordinators are assigned unique beacon slot numbers and the plurality of network coordinators share a same next perceived beacon slot number.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 2 illustrates a protocol format for time division multiple access (TDMA) communications implemented in accordance with an embodiment of the invention.

FIG. 6 illustrates a network that avoids beacon collisions implemented in accordance with an embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Figure 1:
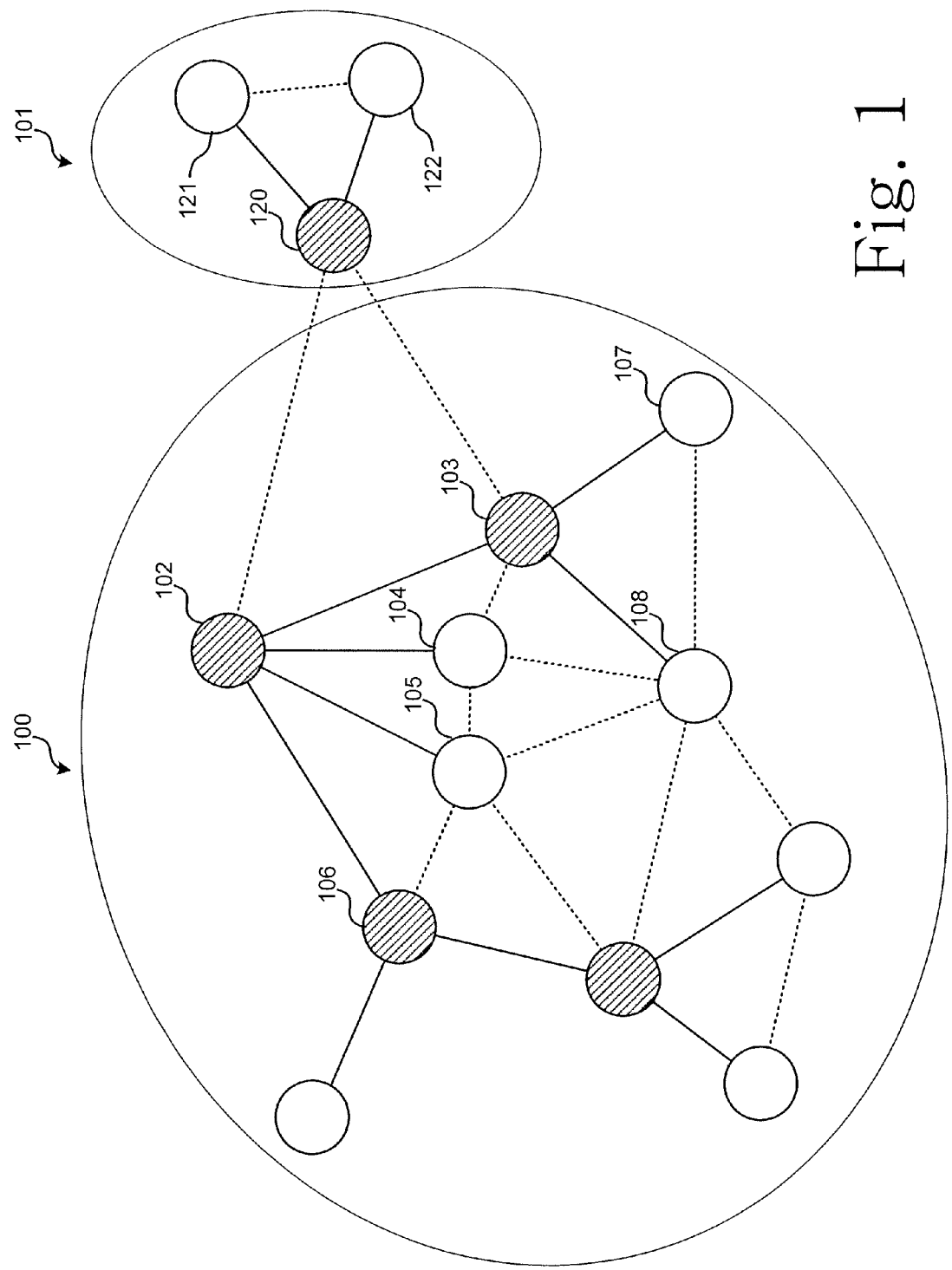
FIG. 1 illustrates a star topology network and a tree topology network implemented in accordance with an embodiment of the invention.

The present invention is directed toward a system and method for medium access control in personal area networks, such as BANs. In various embodiments of the invention, networks are organized into coordinator and end device roles. A coordinator is responsible for managing communications with connected end devices. For example, FIG. 1 illustrates one such networks. In FIG. 1, white nodes represent end devices while shaded nodes represent coordinator devices, and solid lines indicate logical tree links between connected devices while dashed lines indicate that the devices are physical links that indicate the nodes are within transmission range of each other. In the illustrated networks, logical links (solid lines) occur only between network coordinators and end devices. End devices do not initiate communications with each other. However a device operating as a network coordinator for a sub-tree of end devices may itself operate as an end device for a parent network coordinator.

A network may involve multiple sub-networks of tree-toplogy or star-topology. Network 100 illustrates a tree topology sub-network. In network 100, a first node 102 is a network coordinator for four end devices, nodes 103, 104, 105, and 106. Some of these end device nodes are network coordinators themselves for their own end devices. For example, node 103 is a network coordinator for nodes 107 and 108. Some network devices implemented in accordance with the present invention are configured to act interchangeably as network coordinators or end devices. For example, node 107 might be implemented to also serve as a network coordinator if an additional node were to attempt to join network 100. Other devices implemented in accordance with the present invention may be configured to serve only as network coordinators, or only as end devices. For example, an end device only node may be part of a low-power implantable sensor, where it is more desirable to have a long battery life than to have the ability to act as a network coordinator. As another example, a network coordinator device may comprise a central electronic device worn by a user and configured to serve as a trunk in a tree-topology network or the central node in a star-topology network. Such a network coordinator device may be configured to interface with external networks, for example to broadcast sensor telemetry, or to route incoming and outgoing data.

Network 101 illustrates a star-topology sub-network. Here, a central node 102 acts as network coordinator for end device 122 and 121. In some embodiment, network 101 may be a star-topology network only by virtue of the current number of connections. For example, if a new node outside the range of node 120 but within the range of node 122 were to attempt to joint network 101 then node 122 could become a network coordinator for the new node, thus forming a tree-topology network. In other embodiments, network devices may be configured to only operate in a star-topology mode. In still further embodiments, networks may be configured to change between star-topology and tree-topology mode according to certain network conditions. For example, a star-topology network may change to a tree-topology network if more than a predetermined number of end devices join the network.

FIG. 2 illustrates a protocol format for time division multiple access (TDMA) communications implemented in accordance with an embodiment of the invention. In some embodiments of the invention, network coordinators are network devices that coordinate network communications that occur in communication windows such as superframes or beacon intervals. In the illustrated embodiments, network communications are organized into superframes. The superframe comprises a plurality of timeslots grouped into different types of periods. FIG. 2A illustrates the format of a single superframe. A superframe 200 comprises a beacon period (BP) 201, a priority access period (PAP) 202, a contention access period (CAP) 203, and a contention free period (CFP) 204. The beacon periods 201 bound one superframe from the next and occur at a predetermined frequency. During the beacon period 201, the network transmits a beacon to its connected end devices. The PAP 202 is a group of timeslots that is reserved for periodical guaranteed communications with end devices. The CAP 203 is a group of timeslots that are set aside to allow end devices to contend with each other for access to the coordinator. The CFP 204 is a group of reserved timeslots to communicate data packets between the coordinator and end devices; the network coordinator handles reservations and allocations of the CFP slots. In some embodiments, a superframe 200 may also comprise an inactive period 205. For example, a certain number of timeslots may be designated as a guard interval between successive superframes, some of the available time slots might not be used in a given superframe, or an inactive period of a predetermined length might be maintained to be used to avoid inter or intra network interference. Although the periods in the illustrated embodiment are contiguous periods arranged in a particular temporal order, other embodiments may vary these conditions. For example, the order of the PAP 202, CAP 203, and CFP 204 may be changed, inactive timeslots may be inserted between periods, or the periods themselves may be broken up and distributed throughout a superframe.

During beacon period 201, each network coordinator in the network transmits a beacon. Awake or active end devices monitor the beacon period to receive control information from their network coordinator. Beacons may contain various control information for network operations. For example, a network coordinator's beacon may contain an ID for the coordinator and the network; an ID for the end device assigned to the current PAP, the current PAP's slot number, size, and an indication that the coordinator or the assigned device will initiate communications during the PAP; the beginning slot number and size of the CAP; and the CFP slot number, reserved slot numbers, sizes, and IDs of devices having reservations.

During a given superframe, at least one slot is assigned to a particular end device for prioritized access. This is illustrated in FIG. 2B. In FIG. 2B, N total end devices are connected to the beaconing network coordinator. A superframe group 210 is formed from a plurality of superframes 1 through N (211, 221). Each superframe of the group has a PAP that is reserved for communications with a particular end device. For example, in superframe 211, PAP 213 is reserved for end device 1, while in superframe N 221, PAP 223 is reserved for end device N. In some embodiments, the order in which the end devices have their PAPs is a predetermined 1-1 function based on a device ID. Accordingly, an end device can determine its PAP location within the superframe group using its ID and knowledge of how many end devices are in the group. In some embodiments, each PAP can be designated as a single time slot, or in other embodiments, each PAP could be a predetermined number of timeslots. The PAPs may be used for various types of communications between a network coordinator and an end device. For example, an device or a network coordinator might transmit a data packet indicating an emergency condition during a PAP (for example, if a heart attack sensor or fall sensor needed to transmit a heart attack or fall indication). As another example, PAPs may be used to reserve slots during a CFP. For example, in superframe 211, device 1 can use its assigned PAP 213 to reserve slots 215 within the CFP 216. In some cases, for example, if many end devices are contending for CAP access, this can be a faster way for devices to reserve CFP slots than using the CAP. If the superframes used for network communications have a predetermined time length $T_s$, then a superframe group for N end devices has a length $T_s*N$. A given end device within the group will have a PAP every N superframes. Accordingly, the maximum response latency for the device is the length of the superframe group, $T_s*N$.

If an end device wishes to communicate with its coordinator before its next PAP, it can use a CAP 203. The CAP 203, 213, or 224, is an open period that any active end device may use for communication with the network coordinator. In various embodiments, different methods of contention access may be used amongst the end devices to gain access to CAP slots. For example, Carrier Sense Multiple Access with Collision Avoidance (CSMA/CA), Slotted Aloha, or other prioritized contention method may be used for access to CAPs. Once an end devices gains access, the end device can use the CAP for various communications. The end device can use the CAP to make a CFP reservation request and to receive a response to the request from the coordinator. The end device can also use the CAP to exchange data with the coordinator, such as non-periodic data or burst data that the device wishes to send before its next PAP or in addition to periodic data sent during its PAPs. In further embodiments, priority parameter sets are assigned to different types of data to allow higher priority data to gain access to the channel more easily.

Figure 3:
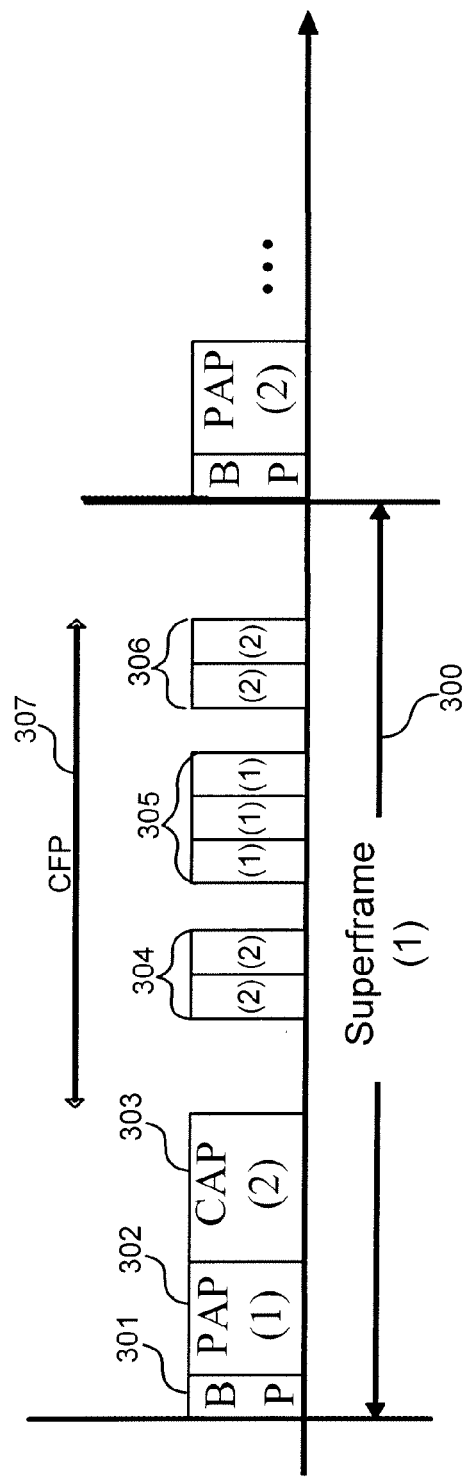
FIG. 3 illustrates use of the contention free period in a network implemented in accordance with an embodiment of the invention.

FIG. 3 illustrates use of the contention free period in a network implemented in accordance with an embodiment of the invention. The CFP is used for reserving timeslots for guaranteed data communication between the network coordinator and end devices. The CFP may be especially useful for real time applications that have higher QoS requirements, such as high throughput and low latency. When the number of end devices associated with a particular network coordinator increases, it can be difficult to achieve such QoS requirements with contention access as in a CAP. FIG. 3 illustrates communications in a network with a network coordinator and at least two end devices. Accordingly, as described above, the superframe group is at least 2 superframes long. CFP reservations may be made by either the network coordinator or an end device. During the beacon period 301, the network coordinator can make a reservation requirement to and receive a response from a particular end device. The beacon sent by the network coordinator also includes a listing of currently reserved timeslots during the CFP 307 and the corresponding end devices. In addition to a network coordinator reserving CFP 307 timeslots during the beacon period, end devices may reserved CFP slots during a PAP 302 or CAP 303. CFP slot reservations may be made for multiple timeslots within a given superframe, or may be made for a certain number of slots in multiple superframes. In some embodiments, CFP slot reservations are allowed to be made with particularity, for example an end device (such as a device with real time data to transmit) could request CFP slots that are distributed throughout the CFP, and another end device (for example, a low power battery saving device with rare bursty data) could request CFP slots that are close together to allow the device to maximize hibernation time. In a particular embodiment, end devices are limited to reserving no more than one CFP slot in multiple superframes but may reserve multiple CFP slots in a single superframe. In various embodiments, the reserved CFP slots do not need to be consecutive or contiguous. In the illustrated example, slots 304 and 306 are reserved by end device (2), and slots 306 are reserved by end device (1).

Figure 4:
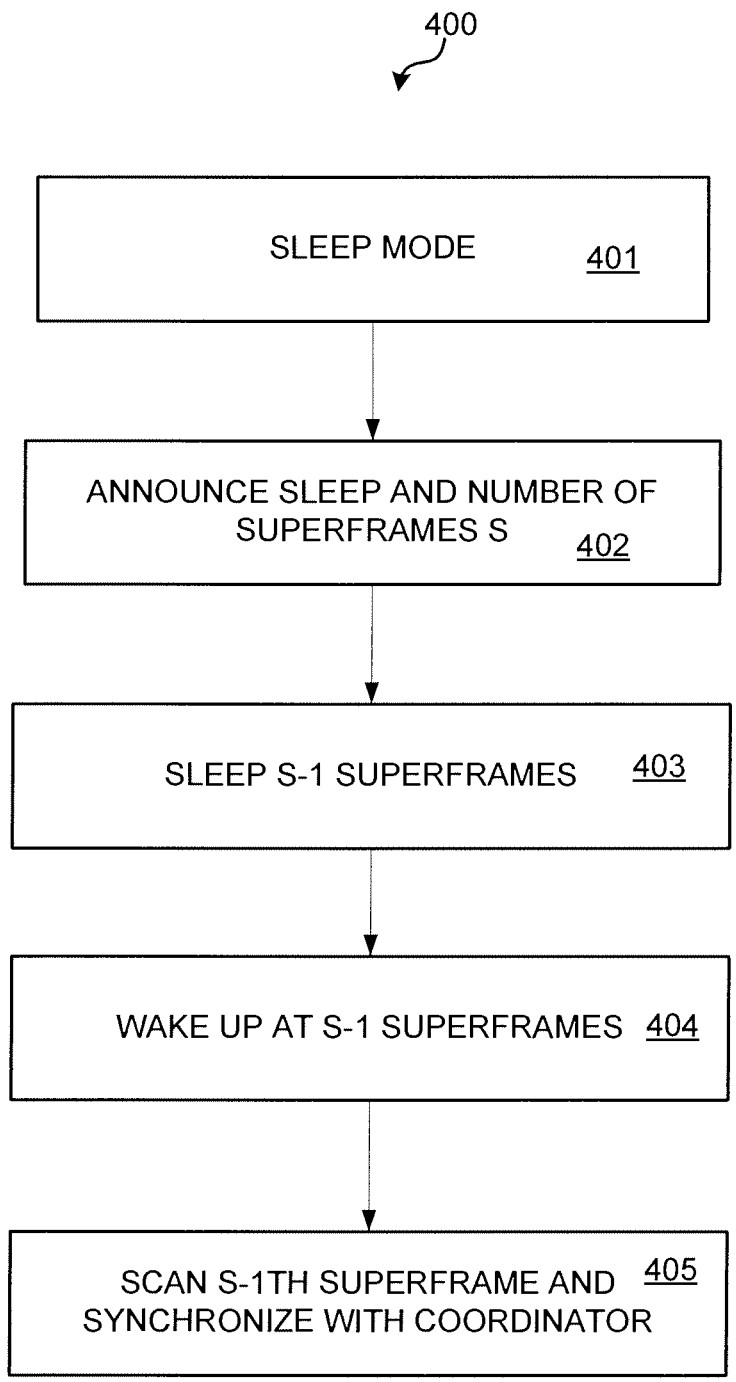
FIG. 4 illustrates a method of power saving implemented in accordance with an embodiment of the invention.

FIG. 4 illustrates a method of power saving implemented in accordance with an embodiment of the invention. As illustrated in FIG. 2, an inactive period 205 may be present in some superframes 200. In some embodiments, end devices may enter into a sleep mode where they neither transmit nor monitor the channel for periods where they know they have no scheduled communications. However, active end devices should awaken for at least the BP and their PAP in case the network data has to send emergency or high priority data to the end device. Furthermore, the network coordinator may safely hibernate during the inactive period 205. Additionally, in some embodiments and end device may be allowed to hibernate for multiple superframes. FIG. 4 illustrates a method 400 of multi-superframe hibernation. When an end device enters sleep mode 401, it alerts the network coordinator that is entering sleep mode and the number of superframes S for which it will be hibernating. In some embodiments, when S is greater than N, the number of end devices in the network (and the number of superframes in the superframe group) the network device maintains the PAP for the sleeping end device and maintains the sleeping end device in its list of associated end devices. Accordingly, if the end device must cancel the sleep mode and transmit data (i.e., in case of emergency) the end device still has its PAP reserved in case it cannot access the CAP. After announcing its entry into sleep mode, the end device sleeps for S-1 superframes 404. This allows the end device to wake up one superframe earlier 404 than its scheduled time. The end devices uses this extra superframe to scan the superframe 405 to listen to the beacon, synchronize with the coordinator, and get ready for normal operation after hibernation. In some embodiments, the number of superframes that an end device hibernates depends on its PAP scheduled time. In one embodiment, a hibernating device should always wake up before its next PAP slot in order to receiver emergency data from the coordinator. In other embodiments, this may be relaxed, such that an end device might have to wake up every other PAP, every third PAP, or some other predetermined hibernation limit number of superframes.

Figure 5:
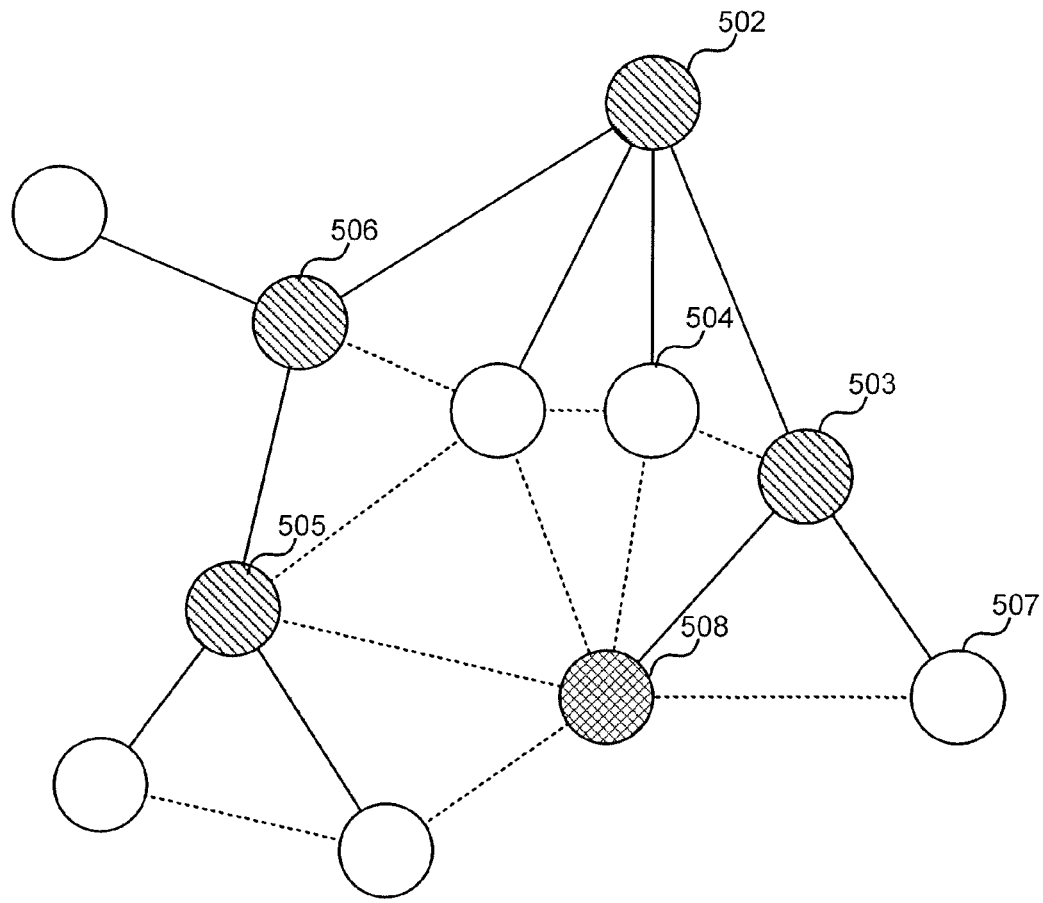
FIG. 5 illustrates an example tree topology network implemented in accordance with an embodiment of the invention.

In a tree topology network, multiple child devices can coexist on a network but have different parent network coordinators. Devices that are on different branches of the network tree and that are more than 2 hops away from each other cannot receive beacons from each other. For example, in the tree topology network illustrated in FIG. 5, end device 508's parent network coordinator is coordinator 503, while network coordinator 505's parent coordinator is coordinator 506. Here, end device 608 is on a different branch than and cannot receive a beacon from coordinator 604. This raises the possibility of interference through beacon collisions. For example, if no interference control were present, and network coordinators 503 and 505 transmitted their beacons at the same time, then a beacon collision would occur at end device 508, which is logically connected to coordinator 503 but within physical range of coordinator 505.

In some embodiments, simultaneous beacon transmissions are prohibited among: a coordinator, its parent, and all of its children coordinators; and any coordinators that share a physical neighbor device. A beacon sent by a coordinator must be correctly received by its parent coordinator, all its children coordinators, and all its children end devices. FIG. 6 illustrates a network that avoids beacon collisions implemented in accordance with an embodiment of the invention. In the illustrated network, the network beacon period 610 is distributed into groups of timeslots called beacon slots. These beacon slots are distributed through a scheduling algorithm that assigns an interference-free beacon slot to each network coordinator. For example, in the illustrated network, coordinator 602 is assigned beacon slot 612, network coordinator 606 is assigned beacon slot 616, network coordinator 603 is assigned beacon slot 616, and network coordinator 604 is assigned beacon slot 614. In some embodiments, all active devices (coordinators and awake end devices), are configured to listen to and process all beacons during the beacon period. To allow new network coordinators to receive a beacon slot when joining the network, in some embodiments the coordinators include an indication of their beacon slot number, and the next available beacon slot number. This is illustrated in FIG. 6 as ordered pairs (beacon slot #, next available slot #) next to the coordinator nodes. When a new coordinator joins the network, it gets a new beacon from its parent. In the illustrated embodiment, the next coordinator would get beacon slot #5, and all coordinators would update their next available slot number to slot #6. A parent coordinator is responsible for expanding or contracting the BP when a child coordinator joints or leaves, respectively.

Figure 7:
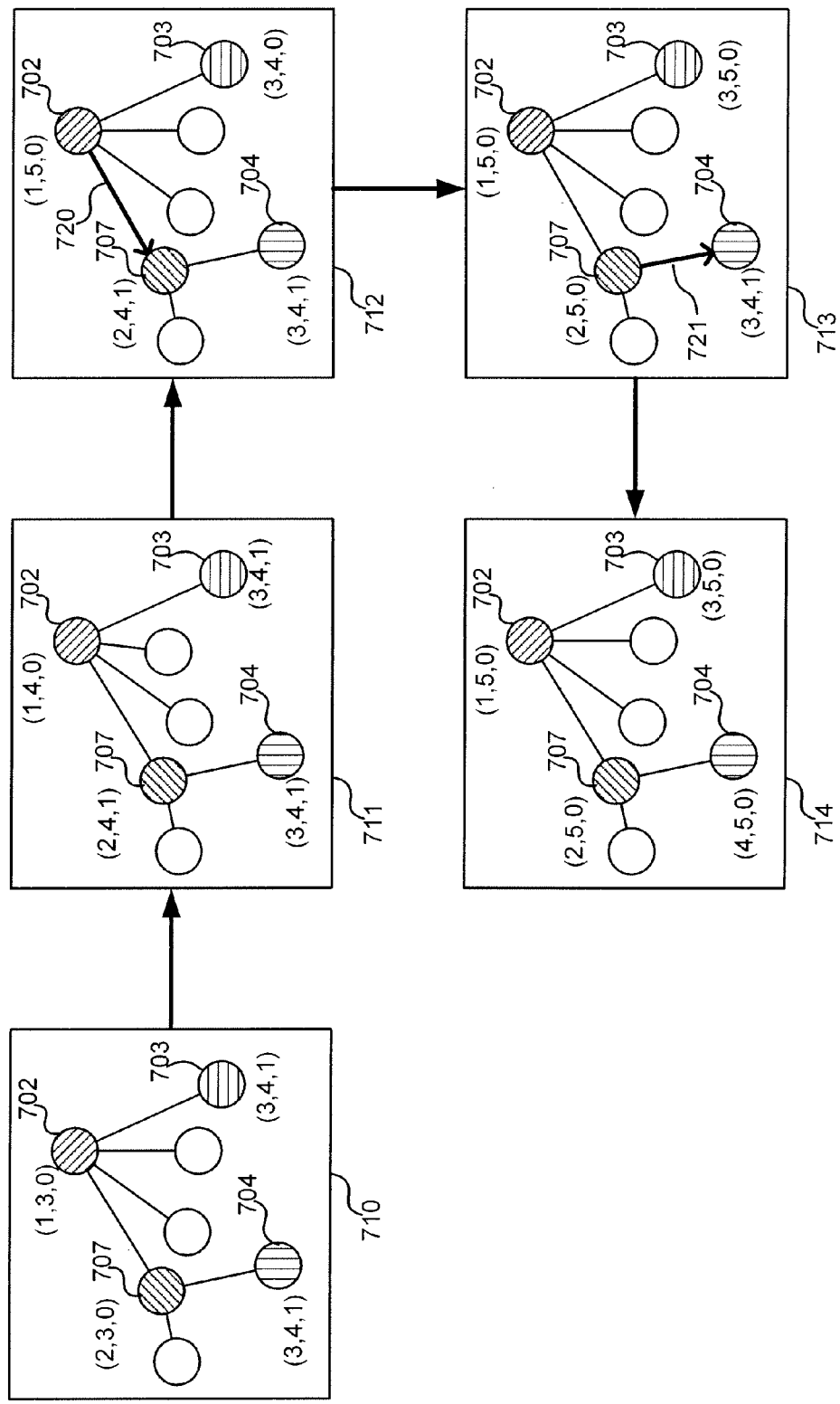
FIG. 7 illustrates a process of beacon slot assignment and scheduling according to an embodiment of the invention.

FIG. 7 illustrates a process of beacon slot assignment and scheduling according to an embodiment of the invention. According to an embodiment of the invention, a method for distributed beacon slot scheduling proceeds as follows:

First, each coordinator maintains a 3-tuple (a,b,c) representing its own beacon slot number, its perceived next available beacon slot number, and the number of newly joined devices in the sub-tree rooted at this coordinator.

Second, when a coordinator's parameter b is equal to every child and parent's parameter b, there is no conflict and the coordinator resets its parameter c to zero, unless a child or parent has a nonzero c parameter.

Third, when a coordinator receives beacons from its child coordinators with positive parameter c. It sums the received parameter c's to learn how many new devices are joining at the same time under its sub-tree. Assuming there are n children with c parameter $c_i$ (i=1, ... n), this coordinator updates its own parameter b according to Eq (1).

$$b = \max\left(b_i + \sum_{j \neq i} c_j\right), \text{ for } i = 1, \ldots, n. \tag{1}$$

Then, it increases its own parameter c by the same amount of increase of its parameter b unless it is the root of the whole tree. If this coordinator is the root of whole tree, it always keeps its parameter c as zero. If there are more than one child having positive parameter c, the root coordinator further chooses a subset of these child coordinators to update their slot number in order to resolve the conflict. Various methods of choosing which children coordinators update their slot numbers may be implemented, for example, the root coordinator could choose based on the children's network IDs.

Fourth, when a coordinator receives a confliction resolution request from its parent, it should further request a subset of its own children to change their slot numbers, and so on until the request reaches the bottom of the tree. After sending the request, the coordinator should reset its own c parameter to 0.

Fifth, when a coordinator receives a beacon from its parent coordinator that has a larger parameter b, it should update its own parameter b to the larger one.

Sixth, when a coordinator receives a beacon from its parent with larger or equal parameter b but a zero parameter c, it should reset its own parameter c to zero too, unless it has a child coordinator with a non-zero c parameter.

FIG. 7 illustrates this method proceeding in a tree topology network with root coordinator 702 and children coordinators 707, 703, and 704. For clarity, physical links of devices within range of each other are not illustrated. The frames illustrate the process that occurs when coordinators 703 and 704 simultaneously attempt to join the network. The triplets (a,b,c) for each coordinator are illustrated beside the nodes. The first frame illustrates the triplets transmitted in the first beacon. In frame 710, the root device 702 transmits the triplet (1,3,0) (because it has the first beacon, and thinks that there are two devices, so the next available beacon is beacon #3, and does not think new devices entered the network, so the c parameter is 0). Similarly, device 707 transmits the triplet (2,3,0). In frame 710, nodes 703 and 704 first beacon, since both perceive that beacon #3 is the next available slot, both 703 and 704 transmit the triplet (3,4,1). In the next superframe beacon period 711, the triplets transmitted are based on the results each device has after running the above algorithm using the triplets transmitted in the previous beacon period (i.e., frame 710).

Root device 702 received the triplet (3,4,1) from 703 in frame 710. Accordingly, in frame 711 follow the third step of the above algorithm and updates its b parameter according to Eq. (1). Furthermore, device 702 is the root device, so it maintains its c parameter at 0. Accordingly, its updated transmitted triplet is (1,4,0). In frame 710, device 707 received triplet (3,4,1) from its child device 704 and received triplet (1,3,0) from its parent device 702. Accordingly, in frame 711, device 707 follows the third step in the algorithm and updates and transmits triplet (2,4,1). In frame 710, both device 704 and 703 did not receive any triplets that would cause them to modify their triplets. Accordingly, in frame 711, both devices re-transmit the triplet (3,4,1).

In frame 711, root device received triplets (2,4,1) from 707 and (3,4,1) from 703. This triggers the third step in the algorithm, and root device updates its triplet to (1,5,0). Furthermore, because it received two beacons with nonzero c parameters, device 702 selects a subset of the devices (here, device 707), and transmits a slot update request 720 to device 707.

In frame 711, device 707 received triplets (1,4,0) from 702 and (3,4,1) from 704. These triplets do not cause device 707 to modify its triplet, so in frame 712, device 707 transmits (2,4,1). (Note, the second step of the algorithm does not apply because child 704 had a non-zero c parameter in frame 711).

In frame 711, device 703 received triplet (1,4,0) from parent 702. Accordingly, by the sixth step of the algorithm, device 703 resets its c parameter and transmits (3,4,0) in frame 712.

In frame 711, device 704 did not receive any triplets that would cause it to modify its triplet, so it retransmits (3,4,1) in frame 712.

In frame 712, device 702 received (2,4,1) from 707 and (3,4,0) from 703. These do not cause 702 to change its triplet, and it transmits (1,5,0) in frame 713. (The non-zero c parameter from 707 would trigger the third step, but eq. (1) is $b_{702}=\max((b_{707}+c_{703}), (b_{703}+c_{707})=\max((4+0),(4+1)=5.)$ In frame 712, device 707 received (1,5,0) from parent 702, (3,4,1) from 704, and also received a slot update request 720 from 702. Accordingly, device 707 follows the fourth step and transmits a slot update request 721 to child 704 and resets its c parameter to 0. Device 707 also follows the fifth step and updates its b parameter to its parent's larger b parameter. Accordingly, device 707 transmits the triplet (2,5,0) in frame 713.

In frame 712, device 703 received (1,5,0) from parent 702. Accordingly, device 703 follows the fifth step and updates its b parameter and transmits (3,5,0) in frame 713.

In frame 712, device 704 received (2,4,1) from parent 707. This does not trigger a triplet change, and in frame 713 device 704 transmits (3,4,1).

In frame 713, root 702 received (3,5,0) from 703 and (2,5,0) from 707. Accordingly, no change is made and 707 transmits (1,5,0) in frame 714. In frame 713, device 707 received (3,4,1) from child 704 and (1,5,0) from parent 702. This does not cause device 707 to update its triplet (for a similar reason as when device 702 did not update its triplet after frame 712, as discussed above). Accordingly, it transmits (2,5,0) in frame 714.

In frame 713, device 704 received (2,5,0) from parent 707 and received update slot request 721 from parent 707. Device 704 is a node at the bottom of the tree, so device 704 updates its slot number to 4. Device 704 also follows the fifth step and updates its b parameter to 5. Device 704 also follows the sixth step and updates its c parameter to 0. Accordingly, at frame 714, device 704 transmits (4,5,0).

The triplets shown in frame 714 are steady state, and will not change as long as the network topology does not change. The resulting network is synchronized; each device has a unique beacon slot number, and each device broadcasts the same next available beacon slot.

As this example shows, network synchronization in beaconing tree topology networks can be achieved even though different nodes on different branches don't necessarily have the ability to hear each others beacons. In embodiments of the invention, this is achieved by each given device forwarding information regarding new network devices in the sub-trees originating at the given device's node. In the above method, this is achieved through the transmission of the c parameter. In other embodiments, other methods of synchronization may be used. For example, each node could transmit a census of its children up to its parent node. Accordingly, the root node can accumulate a census of all beaconing devices on the network, and transmit synchronization commands back down the network.

In addition to protecting beacons from interference, in some embodiments CAP and PAP periods are also protected from interference. In particular, in many embodiments, control packets are transmitted during CAP and PAP periods, and are protected from interference. In these embodiments, because the communication in EAP and CAP may involve a coordinator and all its end devices, all other simultaneous communications within 2-hop of the coordinator should be prohibited. However, end devices do not transmit beacons so coordinators that are 2-hops away may not be aware of each other. Accordingly, if simultaneous reservations are not prohibited, coordinators that are 2-hops away from each other may reserve the same time slots for EAP and CAP use.

Figure 8:
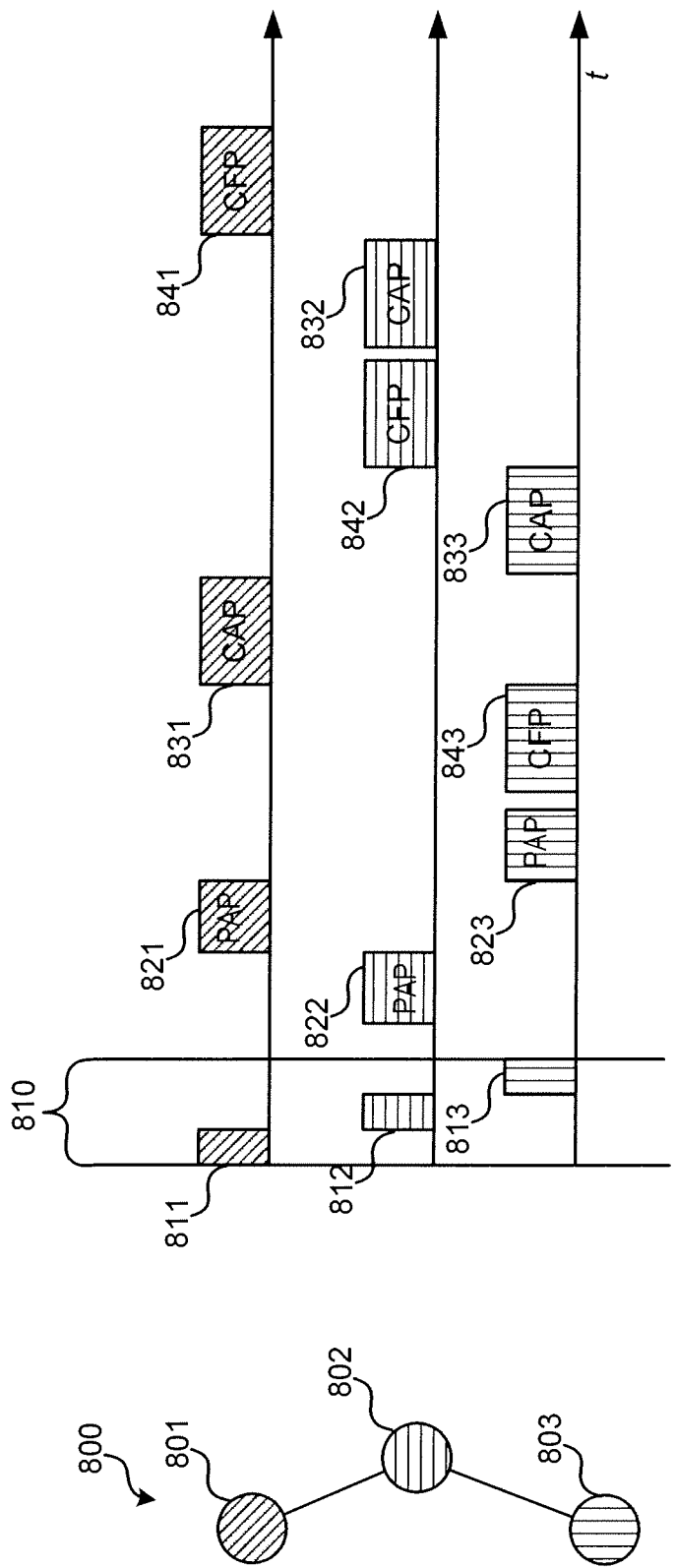
FIG. 8 illustrates a network having non-overlapping beacons, priority access periods, and contention access periods, implemented in accordance with an embodiment of the invention.

In the embodiment illustrated in FIG. 8, a procedure for beacon slot protection, (such as that illustrated in FIG. 7) has been implemented. Network 800 has coordinators 801, 802, and 803. After beacon slot assignment distribution, the beacon period 810 comprises three slots. Device 801 is assigned the first slot 811, device 802 is assigned the second slot 812, and device 803 is assigned slot 813. (If the method illustrated in FIG. 7 were employed, then device 801 would be transmitting (1,4,0), device 802 would be transmitting (2,4,0), and device 803 would be transmitting (3,4,0).)

In this embodiment, the EAP and CAP periods are scheduled using the same scheduling results of the beacon slot assignment. Although the timeslot locations for the CAPs and PAPs within the superframe are not necessarily the same as the orderings of the beacon slots, they are related by a predetermined 1-1 mapping shared among the coordinators. Specifically, if a coordinator's beacon slot number is k a predetermined 1-1 mapping generates unique PAP and CAP slots. This guarantees that any two coordinators with different beacon slot numbers will use different time slots for their PAPs and CAPs. In the illustrated embodiment, device 802's PAP 822 starting slot occurs first, device 801's PAP 821 starting slot occurs after PAP 822, and device 803's PAP 823 starting slot occurs after PAP 821. Similarly, device 801's CAP 831 starting slot occurs first, device 803's CAP 833 starting slot occurs after CAP 831, and device 802's CAP 832 starting slot occurs after CAP 833. In further embodiments, each network device has a unique CFP. For example, the illustrated CFPs 841, 842, and 843, could be uniquely assigned to coordinators 801, 802, and 803, respectively. In other embodiments, the CFP periods are available and may be reserved by any other network coordinator. For example, coordinator 801 may be able to reserve slots during CFP 843, 842, and 841, and likewise for the other coordinators 802 and 803. In some embodiments, during a coordinator's PAP or CAP, any other coordinators and their children end devices do not need to listen to the channel as they do in BP. In other embodiments, various algorithms may be employed to allow for slot reuse to allow overlap of PAPs or CAPs. However, in these embodiments, end devices must participate to allow network information to travel more than 2-hops.

Figure 9:
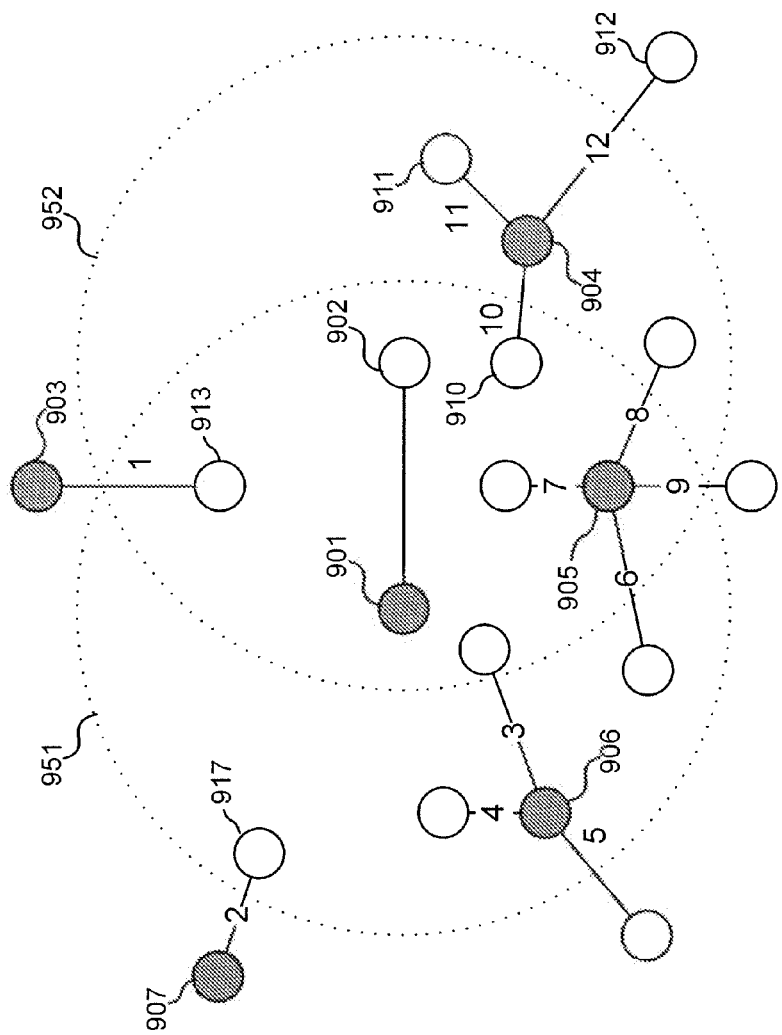
FIG. 9 illustrates a process for timeslot reservation for data communication during the CFP in accordance with an embodiment of the invention.

FIG. 9 illustrates a process for timeslot reservation for data communication during the CFP in accordance with an embodiment of the invention. In this embodiment, the CFP slots are reservable by all devices associated with a shared beacon period with allocated beacon slots. If no reservation protocol is implemented, a block of slots in the CFP reserved for a coordinator and one of its end devices may get interference from other coordinators or end devices in their transmission ranges. (For example, if coordinator 901 reserved slot #7, then there would be interference from (and to) coordinator 905's preceding reservation of slot #7.) In the illustrated network, links illustrate data communications during a CFP with reserved slot numbers next to the links, shaded nodes are coordinators, unshaded nodes are end devices, and circles 951 and 952 indicate the ranges of devices 901 and 902, respectively. Although the illustrated nodes may be organized in a tree-topology network, for ease of description, only CFP communications are considered here. To prevent interference based on simultaneous reservations of the same CFP slots by different links, in some embodiments, network nodes on one link are prevented from reserving the same CFP slots as other network nodes on other links. In the illustrated embodiment, CFP slot reservation proceeds as follows:

First, a coordinator includes reservation information in its beacon, including information on which time slot is reserved for which end device. For example, coordinator 904 would include information in its beacon that indicates slots {10,11,12} are reserved for devices 910, 911, and 912, respectively.

Second, both coordinators and end devices listen to all beacons in the BP, and maintain a list of available slots that are not being reserved by any other neighbor coordinator. For example, if the CFP comprised 12 slots, coordinator 901's list would comprise {1,2,10,11,12} and end device 902's list would comprise {1,2,3,4,5}.

Third, when a device initiates a reservation request to another device (e.g., an end device to a coordinator or vice versa), the requester reserves only those available to it. If device 901 initiates a request to device 902, an example reservation might be a request for slots {1,2,11}.

Fourth, if the requested slots are also available to request receiver, it accepts the request. The coordinator involved in the link, (which could be the requester or request receiver), would then update its beacon.

Fifth, if the requested slots are not available, the request receiver declines the request. In some embodiments, the request receiver may include a list of its own available slots to facilitate a new reservation. Alternatively, the request receiver may include a list of which requested slots it has available. For example, if 901 requested {1,2,11}, then 902 would decline. To facilitate the next requests, 902 could reply with its available slot list {1,2,3,4,5} or with which requested slots it has available {1,2}. When a request is declined, the requesting device can retransmit the request with an updated list of requested slots. For example, 902 could reply to 901's decline with a request for {1,2}.

Sixth, when a device detects a reservation confliction when listening to other coordinators' beacons, it reports to its own coordinator with its updated available slot list and ask to change the reservation. In the present example, once 902 and 901 reserve slots {1,2}, coordinator 901 will announce the reservation in its next beacon. End device 913 and 917 will update their slot lists to exclude {1} and {2}, respectively, and then announce this to coordinators 901 and 907 along with a request to change their reservations.

Figure 10:
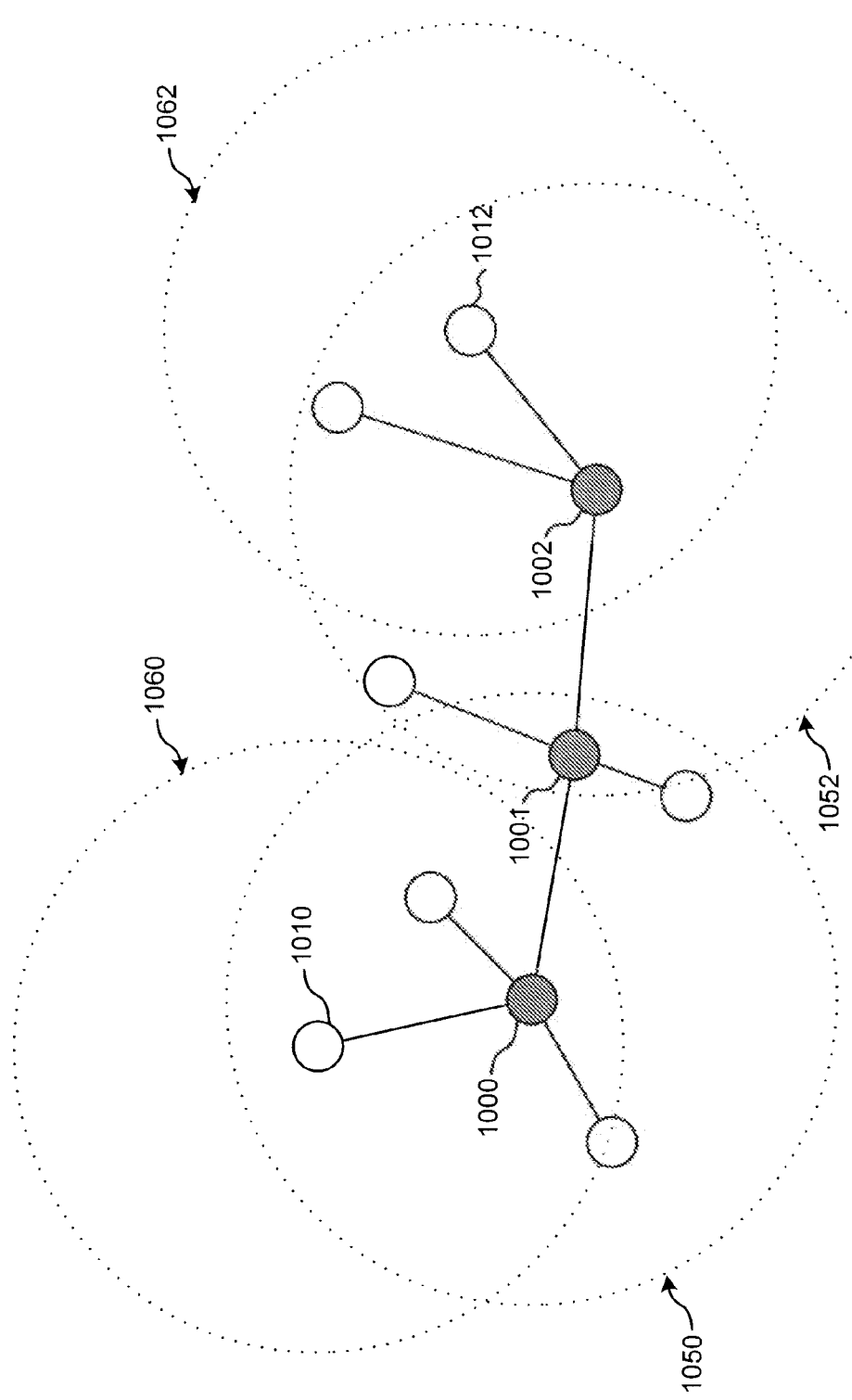
FIG. 10 illustrates contention free period reservation timeslot reuse in an example implementation of an embodiment of the invention.

In the above described method, even though a network shares the pool of reservable CFP slots, CFP slot reuse is still possible. For example, in FIG. 10, coordinators 1000, 1001, and 1002 are linked as indicated. Coordinator 1000 is connected to end device 1010, while coordinator 1002 is connected to end device 1012. Circles 1050 and 1052 illustrate the ranges of coordinators 1000 and 1002, respectively. Likewise, circles 1060 and 1062 illustrate the ranges of end device 1010 and 1012, respectively. Since the pair 1010 and 1000 is not within range of 1002 and 1012, and vice versa, reservations made for one link will not be received by the other pair. Therefore, the devices will not remove those reservations from their available slot lists, and the CFP for coordinator 1000 can overlap with the CFP for coordinator 1002.

Figure 11:
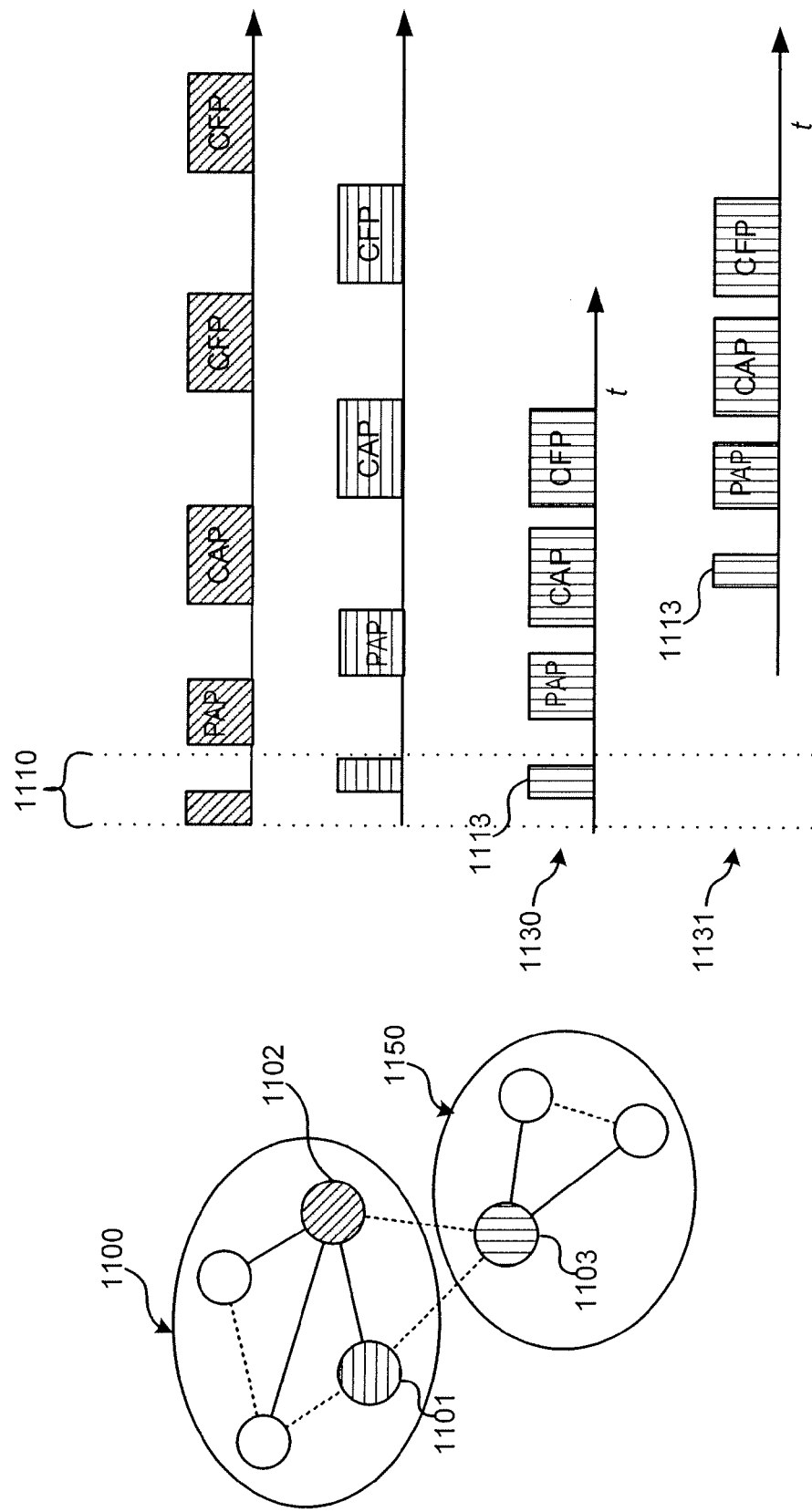
FIG. 11 illustrates a method for network alignment and interference mitigation between different networks implemented in accordance with an embodiment of the invention.

FIG. 11 illustrates a method for network alignment and interference mitigation between different networks. The methods described above allow beacon and network alignment for devices within a single tree network. However, in some cases, different networks may operate in the same location, or a network may enter the range of another. Without network alignment, devices in different networks cannot synchronize with each other correctly, so the devices cannot find each other even if they are willing to communicate with each other. Additionally, if the unaligned networks are not aware of each other, they may communicate beacon or data simultaneously and thereby interfere with each other. In FIG. 11, the possibility for between-network interference exists when network 1150 nears network 1100 such that coordinator 103 is within range of network coordinators 1101 and 1102.

Since the superframe timing of different networks will in general be different, there are two possible cases when unaligned networks co-exist. First, the beacons of one network could overlap with the beacon of the other network. This is illustrated in case 1130 where beacon 1113 from coordinator 1103 of network 1150 overlaps with the beacon period 1110 of coordinators 1102 and 1101 of network 1100. Second, the beacons of the two networks may have no overlap. This is illustrated in case 1131 where beacon 1113 of coordinator 1103 falls outside of beacon period 1110.

In the first case 1130, detection of the unaligned network may be achieved because devices in network 1100 are configured to monitor the beacon period, so they will detect the beacon 1113 and the presence of unaligned network 1150. In the second case 1131, the networks will not detect each other simply by monitoring the beacon period. Accordingly, in some embodiments, network coordinators are configured to periodically monitor an entire superframe to detect the transmission of any non-overlapping beacons.

Figure 12:
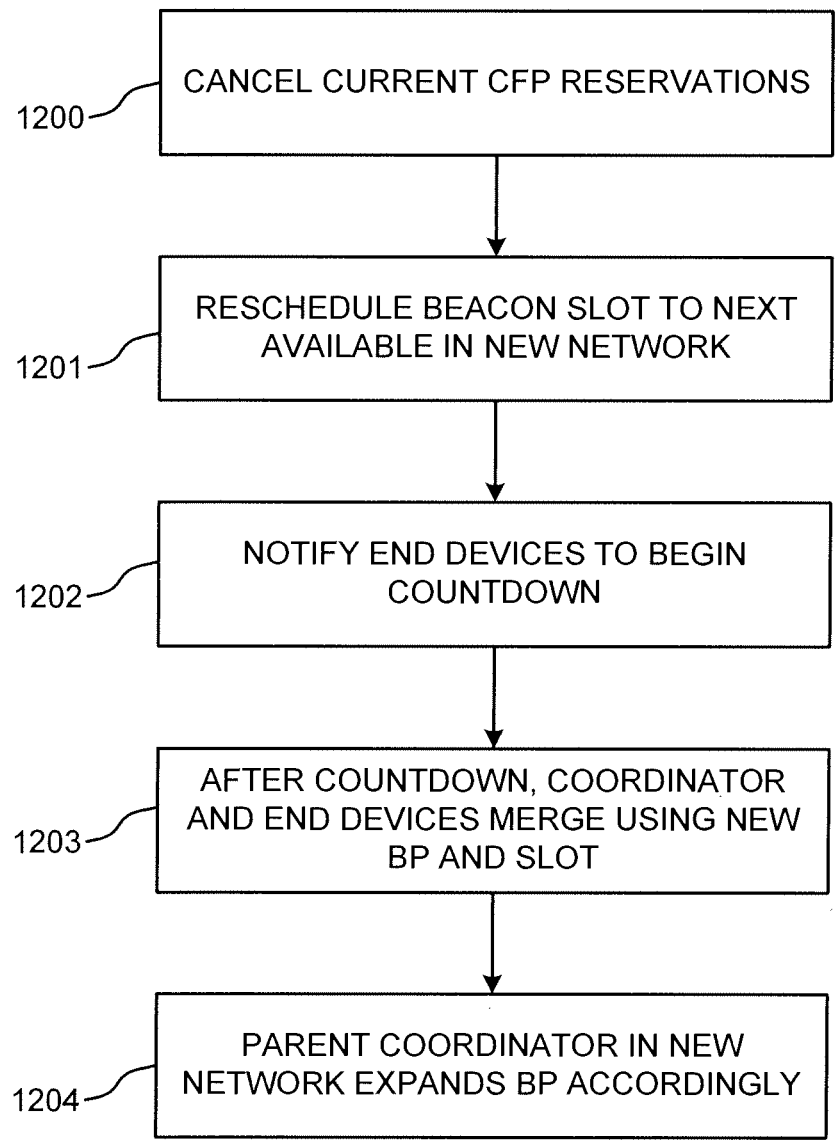
FIG. 12 illustrates a merging method of network alignment in accordance with an embodiment of the invention.

FIG. 12 illustrates a merging method of network alignment in accordance with an embodiment of the invention. Network merging a method for unaligned networks to align their beacon periods to avoid interference and allow communications between the networks. In the illustrated embodiment, one of the networks is chosen to merge into the other network. Various methods may be employed for deciding which network merges into the other. For example, the smaller network could merge into the larger network, or the network with the first occurring BP could absorb the later BP network. In step 1200, each network coordinator cancels its current CFP reservations. In step 1201, the network coordinator reschedules its beacon slot to the next available slot in the new network's BP. In some embodiments, the network coordinators could stagger their scheduling and merging procedures such that beacon slot reservation collisions do not occur. In other embodiments, the network coordinators could employ a method of beacon slot scheduling and distribution with the new network, such as the one described with respect to FIG. 7.

In step 1202, each network device of the merging network alerts its end devices to change the BP time after certain number of superframes and to start counting down the superframes. After the countdown, in step 1203, the coordinator and its end devices merge into the new network using the beacon slot obtained in step 1201. In step 1204, the parent coordinators of the new network, and the root coordinator of the new network expand the BP according to the number of merging coordinators joining the network.

Figure 13:
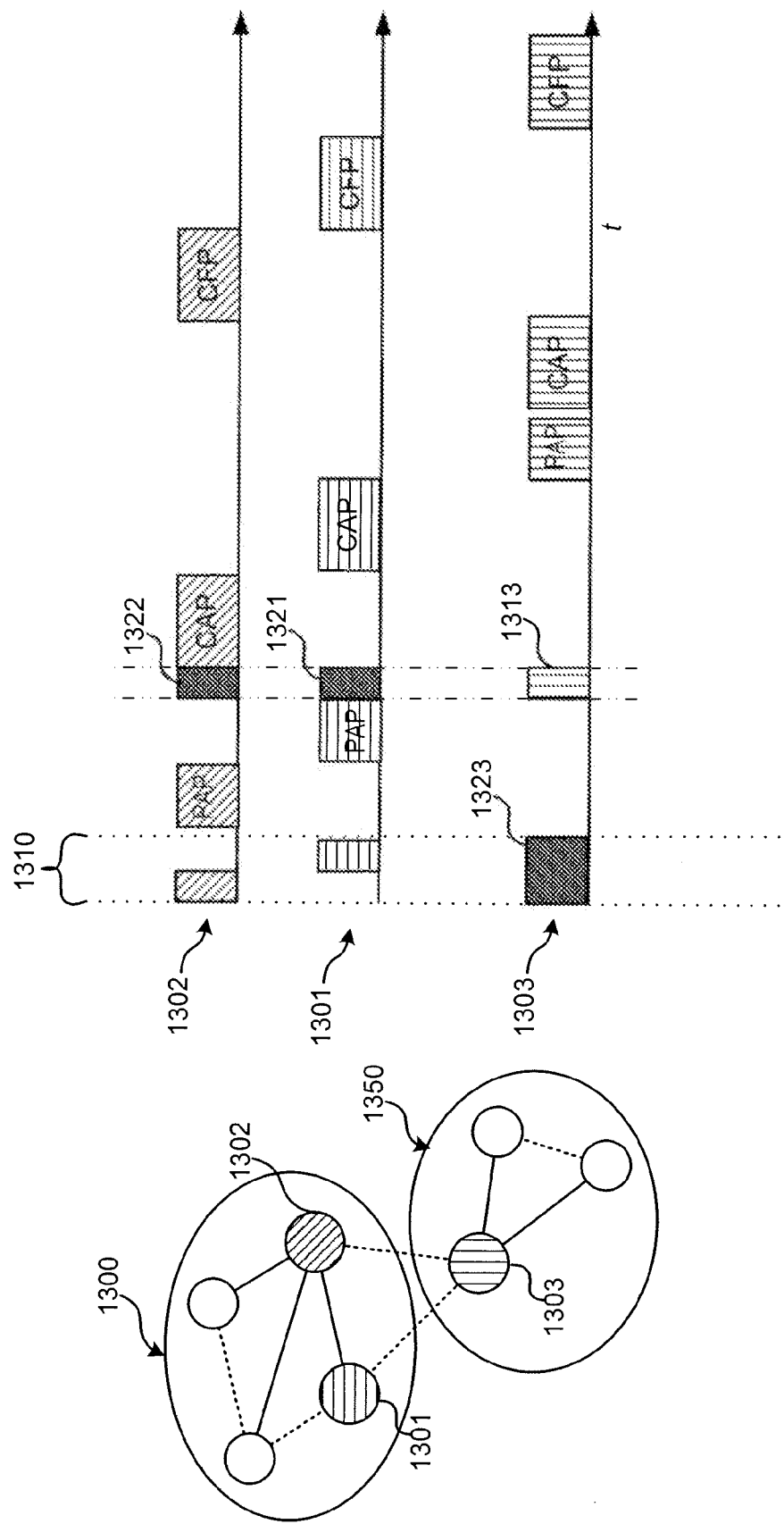
FIG. 13 illustrates a non-merging method of network alignment implemented in accordance with an embodiment of the invention.

FIG. 13 illustrates a non-merging method of network alignment implemented in accordance with an embodiment of the invention. In non-merging network alignment, when a coordinator detects another unaligned coordinator, it reserves the times slots corresponding to another network's BP, similar to the reserved CFP slots for normal data communications. In the illustrated embodiment, when coordinator 1303 detects beacons from coordinators 1302 and 1301 during beacon period 1310, coordinator 1303 reserves timeslots 1323. Similarly, coordinators 1302 and 1301 respectively reserve timeslots 1322 and 1321 corresponding to coordinator 1303's beacon 1313. These reservations are maintained and broadcast in the coordinators' beacons as unavailable timeslots. Accordingly, the coordinator and end devices will not interference with beacon transmissions in another unaligned network's BP. However, in contrast to regular reserved CFP slots, coordinators and end devices are configured to listen to the channel during the reserved periods. Accordingly, coordinators and end devices from network 1300 listen to beacon 1313 by monitoring the reserved time 1322. Similarly, coordinators and end devices from network 1350 monitor the reserved slots 1323. This allows the devices from unaligned networks to update their own list of available slots such that they will not reserve any slots during the unaligned network's reserved time slots. The non-BP switching network alignment method does not require any actual change of BP. In some embodiments, this is preferable in a dynamic environment where network alignment happens frequently.

In various embodiments, network devices may be configured to perform the methods described with respect to FIG. 12 or 13 exclusively, or may be configured to implement either of the methods according to predetermined conditions. Network devices may be configured to monitor network conditions to allow networks in dynamic environments perform the non-merging method while networks in steady-state conditions use the merging method. In other embodiments, network devices may be configured to first perform one method and the perform the other method. For example, when two networks detect each other's presence, they may be configured to perform the non-merging alignment method for a predetermined number of superframes, or for a predetermined total time, and then to switch to the merging method.

Figure 14:
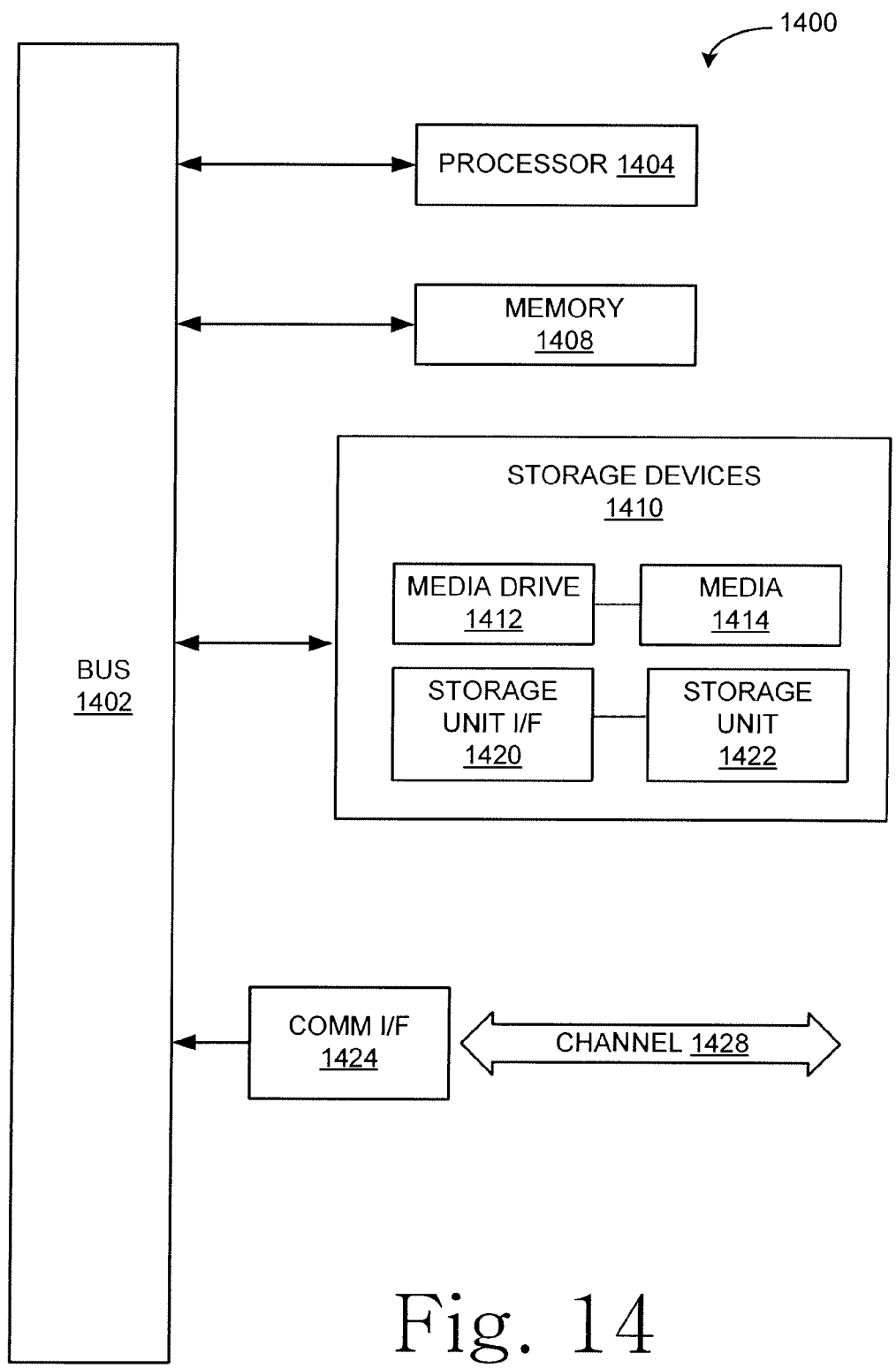
FIG. 14 illustrates an example computing module that may be used in implementing various features of embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 14. Various embodiments are described in terms of this example-computing module 1400. After reading this description, it will become apparent to a person skilled in the relevant art how to implement the invention using other computing modules or architectures.

Referring now to FIG. 14, computing module 1400 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1400 might include, for example, one or more processors, controllers, control modules, or other processing devices, such as a processor 1404. Processor 1404 might be implemented using a general-purpose or special-purpose processing engine such as, for example, a microprocessor, controller, or other control logic. In the illustrated example, processor 1404 is connected to a bus 1402, although any communication medium can be used to facilitate interaction with other components of computing module 1400 or to communicate externally.

Computing module 1400 might also include one or more memory modules, simply referred to herein as main memory 1408. For example, preferably random access memory (RAM) or other dynamic memory, might be used for storing information and instructions to be executed by processor 1404. Main memory 1408 might also be used for storing temporary variables or other intermediate information during execution of instructions to be executed by processor 1404. Computing module 1400 might likewise include a read only memory ("ROM") or other static storage device coupled to bus 1402 for storing static information and instructions for processor 1404.

The computing module 1400 might also include one or more various forms of information storage mechanism 1410, which might include, for example, a media drive 1412 and a storage unit interface 1420. The media drive 1412 might include a drive or other mechanism to support fixed or removable storage media 1414. For example, a hard disk drive, a floppy disk drive, a magnetic tape drive, an optical disk drive, a CD or DVD drive (R or RW), or other removable or fixed media drive might be provided. Accordingly, storage media 1414 might include, for example, a hard disk, a floppy disk, magnetic tape, cartridge, optical disk, a CD or DVD, or other fixed or removable medium that is read by, written to or accessed by media drive 1412. As these examples illustrate, the storage media 1414 can include a computer usable storage medium having stored therein computer software or data.

In alternative embodiments, information storage mechanism 1410 might include other similar instrumentalities for allowing computer programs or other instructions or data to be loaded into computing module 1400. Such instrumentalities might include, for example, a fixed or removable storage unit 1422 and an interface 1420. Examples of such storage units 1422 and interfaces 1420 can include a program cartridge and cartridge interface, a removable memory (for example, a flash memory or other removable memory module) and memory slot, a PCMCIA slot and card, and other fixed or removable storage units 1422 and interfaces 1420 that allow software and data to be transferred from the storage unit 1422 to computing module 1400.

Computing module 1400 might also include a communications interface 1424. Communications interface 1424 might be used to allow software and data to be transferred between computing module 1400 and external devices. Examples of communications interface 1424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1424 might typically be carried on signals, which can be electronic, electromagnetic (which includes optical) or other signals capable of being exchanged by a given communications interface 1424. These signals might be provided to communications interface 1424 via a channel 1428. This channel 1428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1408, storage unit 1420, media 1414, and channel 1428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1400 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for a network coordinator to communicate on a network, comprising:
   associating with a plurality of end devices;
   communicating with the end devices during a group of superframes, wherein the group of superframes comprises a number of superframes equal to the number of end devices of the plurality of end devices, and wherein each superframe of the group of superframes comprises a beacon period bounding the superframe, a priority access period, a contention access period, and a contention free period;
   for each superframe of the group of superframes, reserving the priority access period for an end device of the plurality of end devices such that, through the step of reserving, each end device of the plurality of end devices is scheduled to have its own priority access period during the superframe group;
   for each superframe of the group of superframes, scheduling the contention access period for the end devices to contend for access to communicate with the network coordinator; and
   reserving a communication period during one of the contention free periods of the group of superframes between an end device of the plurality and the network coordinator for a particular superframe; and
   during each superframe of the group of superframes, transmitting a beacon during the beacon period that includes information identifying which end device has the scheduled priority access period for the current superframe and when scheduled priority access period begins, information about when the contention access period for the current superframe begins, and information about what reservations have been made for the contention free period for the current superframe.

2. The method of claim 1, wherein:
   the network coordinator is one of a plurality of network coordinators of the network, the plurality of network coordinators sharing the beacon period;
   the beacon period is divided into a plurality of beacon slots; and
   the network coordinator is assigned its own beacon slot during the beacon period.

3. The method of claim 2, wherein the beacon further comprises information about the network coordinator's beacon slot number; a perceived next available beacon slot number; and a beacon slot conflict indicator.

4. The method of claim 2, further comprising:
   scanning a superframe to detect an unaligned network coordinator that does not transmit a beacon during the beacon period;
   if the unaligned network coordinator is detected, reserving timeslots corresponding to the unaligned network coordinator's beacon;
   including information regarding the reserved timeslots in the beacon; and
   monitoring transmission from the unaligned network coordinator during the reserved timeslots.

5. The method of claim 1, further comprising:
   monitoring contention free period timeslot reservations contained in beacons transmitted by other network coordinators within transmission range of the network coordinator;
   maintaining a list of available contention free period timeslots;
   receiving a reservation request from an associated end device for a contention free period timeslot;
   determining if the requested timeslot is in the list of available contention free period timeslots;
   if the timeslot is on the list of available contention free period timeslots then reserving the requested timeslot;
   if the timeslot is not on the list of available contention free period timeslots then declining the request and transmitting the list of available contention free period timeslots to the end device that made the reservation request.

6. A method for a network coordinator to communicate on a network, comprising:
   associating with a plurality of end devices;
   scheduling a priority access period for an end device of the plurality of end devices during a communications window, wherein the priority access period is reserved for communications between the end device and the network coordinator;
   scheduling a contention access period for communications with the network coordinator during the communications window; and
   scheduling a contention free period for communications with the network coordinator during a superframe of the communications window, the communications window comprising a superframe group comprising a plurality of superframes, the superframes of the superframe group having priority access periods and contention free periods;
   wherein which superframe of the superframe group comprises a given end device's assigned priority access period is determined according to a predetermined 1-1 function of end device IDs to superframe numbers.

7. The method of claim 6, wherein superframes of the superframe group are bounded by beacon periods and further comprising:
   transmitting beacons during the beacon periods to provide control information to the associated end devices;
   scanning a superframe to detect an unaligned network coordinator that does not transmit a beacon during the beacon period;
   if the unaligned network coordinator is detected, reserving a portion of the superframe corresponding to the unaligned network coordinator's beacon;
   including information regarding the reserved portion in the control information; and
   monitoring a transmission from the unaligned network coordinator during the reserved portion.

8. A method for a network coordinator to communicate on a network, comprising:
   associating with a plurality of end devices;
   scheduling a priority access period for an end device of the plurality of end devices during a communications window, wherein the priority access period is reserved for communications between the end device and the network coordinator;
   scheduling a contention access period for communications with the network coordinator during the communications window; and
   scheduling a contention free period for communications with the network coordinator during a superframe of the communications window, the communications window comprising a superframe group comprising a plurality of superframes, the superframes of the superframe group having priority access periods and contention free periods;
   monitoring transmissions from a second network coordinator to determine reservations made by the second network coordinator for portions of the contention free period;

maintaining a list of available portions of the contention free period;
receiving a request from an associated end device to reserve a requested portion of the contention free period;
comparing the requested portion to the list of available portions; and
if the request is declined, transmitting the list of available portions to the requesting end device.

9. The method of claim 8, further comprising:
reserving a given portion of the contention free period for communications with a given end device;
receiving a message from the given end device indicating that another reservation for the given portion of the contention free period has been made by a device outside a range of the network coordinator but inside a range of the given end device;
canceling the reservation of the given portion of the contention free period; and
updating the list of available portions of the contention free period to remove the given portion.

10. A non-transitory computer readable medium having computer executable program code embodied thereon and configured to cause a network coordinator on a network to perform the functions of:
associating with a plurality of end devices;
scheduling a priority access period for an end device of the plurality of end devices during a communications window, wherein the priority access period is reserved for communications between the end device and the network coordinator;
scheduling a contention access period for communications with the network coordinator during the communications window; and
scheduling a contention free period for communications with the network coordinator during a superframe of the communications window, the communications window comprising a superframe group comprising a plurality of superframes, the superframes of the superframe group having priority access periods and contention free periods;
wherein which superframe of the superframe group comprises a given end device's assigned priority access period is determined according to a predetermined 1-1 function of end device IDs to superframe numbers.

11. The non-transitory computer readable medium of claim 10, wherein superframes of the superframe group are bounded by beacon periods and wherein the computer executable program code is further configured to cause the network coordinator to perform the functions of:
transmitting beacons during the beacon periods to provide control information to the associated end devices;
scanning a superframe to detect an unaligned network coordinator that does not transmit a beacon during the beacon period;
if the unaligned network coordinator is detected, reserving a portion of the superframe corresponding to the unaligned network coordinator's beacon;
including information regarding the reserved portion in the control information; and
monitoring a transmission from the unaligned network coordinator during the reserved portion.

12. A non-transitory computer readable medium having computer executable program code embodied thereon and configured to cause a network coordinator on a network to perform the functions of:
associating with a plurality of end devices;
scheduling a priority access period for an end device of the plurality of end devices during a communications window, wherein the priority access period is reserved for communications between the end device and the network coordinator;
scheduling a contention access period for communications with the network coordinator during the communications window; and
scheduling a contention free period for communications with the network coordinator during a superframe of the communications window, the communications window comprising a superframe group comprising a plurality of superframes, the superframes of the superframe group having priority access periods and contention free periods;
monitoring transmissions from a second network coordinator to determine reservations made by the second network coordinator for portions of the contention free period;
maintaining a list of available portions of the contention free period;
receiving a request from an associated end device to reserve a requested portion of the contention free period;
comparing the requested portion to the list of available portions; and
if the request is declined, transmitting the list of available portions to the requesting end device.

13. The non-transitory computer readable medium of claim 12, wherein the computer executable program code is further configured to cause the network coordinator to perform the functions of:
reserving a given portion of the contention free period for communications with a given end device;
receiving a message from the given end device indicating that another reservation for the given portion of the contention free period has been made by a device outside a range of the network coordinator but inside a range of the given end device;
canceling the reservation of the given portion of the contention free period; and
updating the list of available portions of the contention free period to remove the given portion.

14. A method for a network coordinator to participate in beacon slot distribution in a network, wherein the network coordinator is one of a plurality of network coordinators in a tree topology, wherein network communications take place during superframes bounded by beacon periods, and wherein a beacon period comprises a number of beacon slots, the method comprising:
the network coordinator maintaining its own parameters (a, b, c), where a is a beacon slot number assigned to the network coordinator, b is a perceived next available beacon slot number, and c is a conflict indication parameter;
the network coordinator transmitting the network coordinator's (a, b, c) parameters to connected network coordinators, the connected network coordinators including the network coordinator's parent network coordinator or at least one child network coordinator;
the network coordinator receiving (a, b, c) parameters from its parent network coordinator or its child network coordinator;
if the network coordinator's b parameter is equal to every one of its child network coordinators' b parameter and its parent network coordinator's b parameter, the network coordinator resetting its parameter c to zero, unless at least one of its child coordinators or its parent coordinator has a non-zero c parameter;

if the network coordinator received non-zero c parameters from at least one of its child coordinators, then the network coordinator updating its b parameter to max $$\left(b_i + \sum_{j \neq i} c_j\right), \text{ for } i, j = 1, \ldots, n,$$

where n is the number of its child network coordinators, i and j index the n child network coordinators, $b_i$ is the ith of its child network coordinators' b parameter, and $c_j$ is the jth of its child network coordinators' c parameter, and, if the network coordinator is not the root of the tree topology, then the network coordinator increasing its c parameter by the amount of increase of its b parameter or, if the network coordinator is the root of the tree topology, then the network coordinator maintaining its c parameter as 0;

if the network coordinator is the root of the tree topology and the network coordinator receives non-zero c parameters from a plurality of its child network coordinators, then instructing a subset of the plurality of its child network coordinators having non-zero c parameters to increase their beacon slot numbers;

if the network coordinator receives a request to increase its beacon slot number from its parent coordinator and the network coordinator is at the bottom of the tree, then increasing the network coordinator's a parameter;

if the network coordinator receives a request to increase its beacon slot number from its parent coordinator and the network coordinator has any child network coordinators, then instructing a non-empty subset of its child network coordinators to increase their beacon slot numbers and resetting its own c parameter to 0;

if the network coordinator receives a b parameter from its parent network coordinator that is larger than its own b parameter then updating its own b parameter to equal the parent network coordinator's b parameter; and if the network coordinator receives a b parameter from its parent network coordinator that is larger than or equal to its own b parameter and receives a c parameter from its parent network coordinator that is 0, and the network coordinator does not have a child coordinator with a non-zero c parameter, then the network coordinator setting its own c parameter to 0.

15. A method for a network coordinator to participate in beacon slot distribution in a network, wherein the network coordinator is one of a plurality of network coordinators in a tree topology, wherein network communications take place during superframes bounded by beacon periods, wherein a beacon period comprises a number of beacon slots, comprising:

the network coordinator transmitting a beacon during an assigned beacon slot of the beacon period, wherein the beacon comprises information about its assigned beacon slot, information about its perceived next available beacon slot, and information about the number of newly joined network coordinators in a sub-tree of the tree topology rooted at the network coordinator;

the network coordinator receiving a further network coordinator's beacon during the further network coordinator's beacon period comprising information about the further network coordinator's assigned beacon slot, information about the further network coordinator's perceived next available beacon slot, and information about the number of newly joined network coordinators in a second sub-tree of the tree topology rooted at the further network coordinator;

and implementing a beacon slot distribution protocol such that, by the step of implementing, any newly joined network coordinators are assigned unique beacon slot numbers and the plurality of network coordinators share a same next perceived beacon slot number.

16. The method of claim 15, wherein superframes further comprise priority access periods and contention access periods, the network coordinator is assigned a priority access period time and a contention access period time within the superframes that do not overlap with priority access period times or contention access period times assigned to other network coordinators.

17. The method of claim 16, wherein the network coordinator's priority access period time and contention access period times are determined according to a 1-1 function of assigned beacon slot numbers to locations within a superframe, wherein the 1-1 function is shared among the network coordinators of the plurality of network coordinators.

18. A non-transitory computer readable medium having computer executable code embodied thereon, the computer executable program code to cause a network coordinator to participate in beacon slot distribution in a network, wherein the network coordinator is one of a plurality of network coordinators in a tree topology, wherein network communications take place during superframes bounded by beacon periods, wherein a beacon period comprises a number of beacon slots, the computer executable program code configured to cause the network coordinator to perform the functions of:

the network coordinator transmitting a beacon during an assigned beacon slot of the beacon period, wherein the beacon comprises information about its assigned beacon slot, information about its perceived next available beacon slot, and information about the number of newly joined network coordinators in a sub-tree of the tree topology rooted at the network coordinator;

the network coordinator receiving a further network coordinator's beacon during the further network coordinator's beacon period comprising information about the further network coordinator's assigned beacon slot, information about the further network coordinator's perceived next available beacon slot, and information about the number of newly joined network coordinators in a second sub-tree of the tree topology rooted at the further network coordinator;

and implementing a beacon slot distribution protocol such that, by the step of implementing, any newly joined network coordinators are assigned unique beacon slot numbers and the plurality of network coordinators share a same next perceived beacon slot number.

19. The non-transitory computer readable medium of claim 18, wherein superframes further comprise priority access periods and contention access periods, the network coordinator is assigned a priority access period time and a contention access period time within the superframes that do not overlap with priority access period times or contention access period times assigned to other network coordinators.

20. The non-transitory computer readable medium of claim 19, wherein the network coordinator's priority access period time and contention access period times are determined according to a 1-1 function of assigned beacon slot numbers to locations within a superframe, wherein the 1-1 function is shared among the network coordinators of the plurality of network coordinators.

* * * * *